United States Patent
Siol et al.

[11] Patent Number: 5,714,261
[45] Date of Patent: Feb. 3, 1998

[54] PLASTIC PARTICLES WITH A HIGH THERMOSTABILITY

[75] Inventors: Werner Siol, Darmstadt; Markus Parusel, Messel, both of Germany

[73] Assignee: Roehm GmbH Chemische Fabrik, Darmstadt, Germany

[21] Appl. No.: 575,041

[22] Filed: Dec. 19, 1995

[30] Foreign Application Priority Data

Dec. 23, 1994 [DE] Germany .................. 44 46 370.7

[51] Int. Cl.⁶ ............................................. B32B 5/16
[52] U.S. Cl. ............. 428/402; 428/407; 525/302; 525/308; 525/902
[58] Field of Search ........................ 428/402, 407; 525/308, 302, 902

[56] References Cited

U.S. PATENT DOCUMENTS

| | | | |
|---|---|---|---|
| 3,992,486 | 11/1976 | Lang | 260/885 |
| 4,849,480 | 7/1989 | Antonelli et al. | 525/303 |
| 4,912,162 | 3/1990 | Kishida et al. | 525/67 |
| 4,959,408 | 9/1990 | Grant | 524/523 |
| 5,004,785 | 4/1991 | Ida et al. | 525/305 |
| 5,135,981 | 8/1992 | Matsumaru et al. | 524/547 |
| 5,147,903 | 9/1992 | Podszun et al. | 523/115 |
| 5,212,273 | 5/1993 | Das et al. | 526/323.1 |
| 5,576,385 | 11/1996 | Tiefensee et al. | 525/77 |

FOREIGN PATENT DOCUMENTS 628194  2/1963  Belgium .
2833601 2/1980  Germany .

*Primary Examiner*—H. Thi Le
*Attorney, Agent, or Firm*—Oblon, Spivak, McClelland, Maier & Neustadt, P.C.

[57] ABSTRACT

The invention concerns crosslinked plastic particles based on polymethyl (meth)acrylate PP with a particle diameter of 1–15 μm, synthesized from the monomers:

A) methyl methacrylate in fractions of 20 to 99.9 wt %;

B) methacrylic acid ester of formula I:

$$CH_2=C(CH_3)-COOR_1 \quad (I)$$

wherein $R_1$ stands for a $C_{2-8}$ alkyl radical, a $C_{5-6}$ cycloalkyl radical, a $C_{5-6}$ cycloalkyl radical substituted with $C_1-C_4$ alkyl, a $C_{6-14}$ aryl radical, a substituted $C_{6-14}$ aryl radical or an aralkyl radical, in fractions of 0 to 79 wt %;

C) acrylic acid ester of formula II:

$$CH_2=CH-COOR_2 \quad (II)$$

wherein $R_2$ stands for a $C_{1-8}$ alkyl radical, a $C_{5-6}$ cycloalkyl radical which can be substituted with $C_1-C_4$ alkyl, or a perhaps substituted $C_{6-14}$ aryl radical or an aralkyl radical, in fractions of 0 to 50;

D) at least one crosslinking monomer CM, which is, in fact, known, containing at least two radically polymerizable groups in the molecule in fractions of 0.1 to 20 wt %, using molecular weight regulators MR, preferably so-called sulfur regulators, in fractions of 0.01 to 1 part by weight, based on the plastic particles PP.

12 Claims, No Drawings

PLASTIC PARTICLES WITH A HIGH THERMOSTABILITY

BACKGROUND OF THE INVENTION

1. Field of the Invention

The invention concerns plastic particles based on poly (meth) acrylate with a particle diameter of 1–15 μm with increased thermostability.

2. Discussion of the Background

Increasingly, plastic particles, in particular polymethyl methacrylate (PMMA) particles, are used in the art as structure forming agents in the processing of polymers, in particular thermoplastics. As examples, one can mention the use of PMMA particles in the production of displays and films, such as polypropylene films, as light-scattering elements in molding materials and the like. There is special interest in form-stable particles with a defined, as uniform as possible, particle size, in particular in the range of particle diameters of 2–12 μm. Especially with such particles, it is possible to produce various light effects with precisely adjustable refraction differences in a given polymer matrix.

For the production of PMMA plastic particles in the desired size range, the art preferably makes use of dispersion polymerization of methyl methacrylate in non-aqueous media. With the classical methods of emulsion polymerization, only particles with a diameter ≦2 μm can generally be produced without great expense.

A way to produce particles that are larger than those obtained with the usual emulsion polymerization, leads through a seed latex on which the monomers are adsorbed or by which they are absorbed, followed by polymerization, especially with an oil-soluble initiator (see JP-A 86/215,603, Chem. Abstr. 106, 19198z. EP-A 190,886; JP-A 75/130,892, Chem. Abstr. 84, 74863q; EP-B 91,453). Ugelstad et al. (EP 0 003 9059) give a two-step method, in which in the first stage, a dispersion of the polymer particles is produced in solvents such as 1-chlorodecane with the aid of emulsifiers and, in the second stage, a partial water-soluble monomer is added in relatively polar solvents which diffuses into the particles. Subsequently, polymerization is carried out in a conventional manner. A method for the production of crosslinked polyalkyl methacrylate particles via multistep emulsion polymers is indicated also in DE-A 2,833,601. (M. A. Winnik et al., Macromol. Chem. Macromol. Symp. 10/11 483–501 (1987) give an overview of the dispersion polymerization of methyl methacrylate in non-aqueous media.) In German Patent Application No. P 4,327,464.1, a method is given for the production of monodisperse poly(meth) acrylate particles according to the method of precipitation polymerization, in which a (meth) acrylic acid ester is polymerized in a halogen-free solvent, which consists of cyclohexane, by at least 70 wt %, in the presence of a block copolymer with polystyrene fractions in an amount of 0.1 to 10 wt %, based on the monomers in the presence of a percarbonic acid ester.

At high application temperatures, such as are used in the modification of thermoplastics, such as polycarbonate, polypropylene, polyester, the polymethacrylate particles of the traditional type decompose by depolymerization. In the thermal stress of poly(meth) acrylate particles, synthesized half and half of methyl methacrylate and isobutyl methacrylate and crosslinked with 5 parts by weight ethylene glycol dimethacrylate, one observes an almost complete decomposition at 270° C. A use in plastics with such high or even higher processing temperatures, such as polycarbonate (PC) was unimaginable under these circumstances.

The goal therefore was to make available plastic particles based on poly(meth) acrylate in the particle diameter range of 1–15 μm, which are characterized, in contrast to the state of the art, by an increased thermal stability, without sacrificing the other advantageous usage characteristics. The diameter is considered the measure of the particle size; with deviations of the spherical shape., the measure is the largest dimension in projection. The particle size determination can be undertaken with a light microscope.

The requirements of the art are fulfilled to a great extent by the plastic particles based on poly(meth) acrylate, in accordance with the invention, with a particle diameter of 1–15 μm. The invention is based on the observation that plastic particles in the desired size range, synthesized from the monomers methyl methacrylate-acrylic acid alkyl ester-crosslinking agent and polymerized in the presence of small quantities of a molecular weight regulator, exhibit a higher thermostability.

SUMMARY OF THE INVENTION

The invention thus concerns crosslinked plastic particles based on polymethyl (meth) acrylate PP with a particle diameter of 1–15 μm, synthesized from the monomers:

A) methyl methacrylate in amounts of 20 to 99.9 wt %, preferably 30 to 90 wt %, particularly preferred from 40 to 70 wt %;

B) methacrylic acid ester of formula I:

wherein $R_1$ stands for $C_{2-8}$ alkyl radical, a $C_{5-6}$ cycloalkyl radical, a $C_{5-6}$ cycloalkyl radical substituted with $C_1$–$C_4$ alkyl, or a $C_{6-14}$ aryl radical, a substituted $C_{6-14}$ aryl radical or an aralkyl radical, in amounts of 0 to 79 wt %, in particular 20 to 55 wt %;

C) acrylic acid ester of formula II:

wherein $R_2$ stands for $C_{1-8}$ alkyl radical, a $C_{5-6}$ cycloalkyl radical, a $C_{5-6}$ cycloalkyl radical substituted with $C_1$–$C_4$ alkyl, a $C_{6-14}$ aryl radical, a substituted $C_{6-14}$ aryl radical or an aralkyl radical, in amounts of 0 to 50, preferably 1 to 30 wt %, in particular 2 to 10 wt %;

D) at least one crosslinking monomer CM, containing at least two radically polymerizable groups in the molecule in amounts of 0.1 to 20 wt %, preferably 1 to 9 wt %, using molecular weight regulators MR, preferably so-called sulfur regulators in amounts of 0.01 to 1 part by weight, preferably 0.05 to 0.5 part by weight, based on the plastic particles PP.

DETAILED DESCRIPTIONS OF THE PREFERRED EMBODIMENTS

In the context of the present invention, the term "wt. %" as it pertains to monomers A)–D) is based on the total weight of monomers.

In general, the monomer groups A)–D) supplement themselves in the plastic particles PP to make up 100 wt %, unless other monomers copolymerizable with the monomers in accordance with A)–D) are present. Here, for example, one can mention styrene or vinyl acetate, which can be present in amounts of 0 to 10 wt %, based on the total weight of monomers.

Preferably, the acrylic acid esters that can be taken into consideration as homopolymers have a glass transition temperature $T_{\lambda max}$ in the range −20° to +50° C. (For the determination of $T_{80\ max}$, see Vieweg-Esser, *Kunststoff-Handbuch*, Vol. IX, 334–339, Carl Hanser 1975; Ullmann's Encyclopedia of Industrial Chemistry, 5th Ed., Vol. A20, pp. 611–617, VCI 1992).

In addition to methyl methacrylate MMA, the polymer particles PP synthesized in accordance with the invention preferably contain, as acrylic acid esters of formula II, those of butanol, in particular n-butyl acrylate, also methyl acrylate, ethyl acrylate, 2-ethylhexyl acrylate. If methacrylic acid esters of formula I are used, in addition to MMA, then they are preferably ethyl methacrylate, (iso)butyl methacrylate, benzyl methacrylate, phenethyl methacrylate, or propylphenyl methacrylate.

Suitable substituents for the substituted $C_{6-14}$ aryl are $C_{1-4}$ alkyl groups.

As crosslinking monomers CM with at least two radically polymerizable groups in the molecule (see H. Rauch-Puntigam, Th. Voelker, *Acryl- und Methacrylverbindungen*, Springer-Verlag, 1967), one can mention, in particular, those with two different polymerizable units in the molecule, in particular, so-called grafting crosslinking agents, such as allyl (meth) acrylate, but also acrylic or methacrylic acid esters of multivalent alcohols, such as butanediol dimethacrylate, ethylene glycol dimethacrylate, hexanediol diacrylate, trimethloylpropane triacrylate, and the like, in amounts of 1 to 9 wt %, based on the total weight of monomers, preferably 4±2 wt %.

The molecular weight regulation, by the regulator MR, is of particular importance for the solution of the present task, in addition to the composition and the crosslinking of the particles. Regulators MR which can be taken into consideration are conventional molecular weight regulators, in conventional quantities (see H. Rauch-Puntigam, Th. Voelker, *Acryl- und Methacrylverbindungen*, Springer-Verlag, 1967), in particular sulfur regulators, such as dodecyl mercaptan, tert-dodecyl mercaptan, n-butyl mercaptan, thioglycolic acid esters, such as butyl thioglycolate, 2-ethylhexyl thioglycolate, and multifunctional regulators, such as pentaerythritol tetrathioglycolate, in quantities of 0.03 to 2 wt %, in particular 0.05 to 0.5 wt %, based on the total weight of monomers.

In general, the amount of the molecular weight regulators is measured out in such a way that during polymerization in the absence of crosslinking agents, a weight average molecular weight (Mw) in the range of 10,000–1,000,000 would result.

One should emphasize in particular multifunctional regulators, such as the aforementioned pentaerythritol tetrathioglycolate, which is preferably contained in amounts of 0.05 to 1 wt % in the fine plastic particles.

The production method, that is, the polymerization method to be used if it is suitable for the production of polymer particles in the desired particle range using the indicated monomer components plus molecular weight regulators, does not appear to be critical according to results available up to now. Preferably, one can use the principle of the method described in the German Patent Application No. P 4327464.1, that is, precipitation polymerization in cyclohexane or precipitation polymerization in mineral oil. The method products then exhibit (in contrast to the classical bead polymerization) a rather uniform particle size distribution. In connection with the present invention, they are therefore designated as monodisperse. This means that the particles lie, by at least 80 wt %, preferably 90 wt %, within a size range of ±20% from the indicated average value.

As already stated, the production method of the particles in accordance with the invention is not really critical. Thus, it is possible, for example, to use the various aforementioned multistep methods for the production of lattices which are 1–10 μm in size (see, for example, the production of particles 2–3 μm in size according to DE-A 2,833,601). In all these multistage methods, however, one should take care that in each polymerization step crosslinking agents and regulators are equally present.

Below, a tested production method in the form of a precipitation polymerization is indicated. Preferably used as solvent/precipitant L are halogen-free solvents, selected from the group consisting of mineral oil, cyclohexane, fatty acid esters, if necessary, in a mixture with other solvents, among other things. As mineral oils, one can mention, in particular, gas oils with a boiling range of 225–350° C., such as the product Shell Risella gas oil G07, which, for example, can be mixed with esters, such as butyl acetate, mostly in quantities below 30 wt %. As initiators, initiators which are, in fact, common can be used, in particular, peroxide initiators, such as peresters in conventional concentrations which are, such as 0.05 to 2 wt %, based on the monomers. one can mention, for example, the bis(4-tert-butylcyclohexyl)peroxydicarbonate (product INTEROX BCHPC from Peroxid Chemie GmbH).

The polymerization can be carried out in a reactor suitable for precipitation polymerization: with smaller batches, for example, a 500-mL three-neck flask, equipped with a condenser, protective gas inlet device, thermometer, and stirrer. Appropriately, the work is carried out under a protective gas, such as argon. Advantageously, one has the precipitant/solvent L, the monomer(s), and emulsifier as a solution in the reactor. As a guide, one can mention, for example, 150 parts by weight solvent L, calculated with reference to the monomers. Subsequently, heating at, for example, 60° C. is carried out. If the selected internal temperature is attained, the polymerization is started, while stirring, with the addition of the initiator, preferably dissolved in a small amount of solvent L.

Usually, the temperature rises already after a short time, for example, after one minute, wherein the solution, which was clear up to then, becomes turbid. After approximately 5 min, the batch, in general, already appears white. Under the described prerequisites, one can expect an increase of the internal temperature to approximately 81° C. after approximately 20 min, wherein the internal temperature can remain at this temperature for a few minutes as a result of evaporative cooling. As a typical precipitation polymerization, the polymerization takes place rather quickly, so that care must be taken to have a good cooling and stirring. For the post-reaction, the temperature of approximately 80° C. is maintained over a certain time, for example, approximately 1 h, while stirring and then the solution is allowed to cool to room temperature while stirring.

The dispersions thus obtained are almost completely coagulate-free. Monodisperse polymer particles are obtained in the indicated size range (diameter 1–15 μm).

Of interest are, for example, crosslinked, homogeneous particles of ≧90 wt % MMA, butyl acrylate and 2.5 wt % allyl methacrylate, and 0.2% regulator in a particle size range of 2.0–10.0 μm or, particularly preferred, in a particle size range of 3–8 μm.

The plastic particles obtained in accordance with the invention meet the requirements of the art with regard to thermostability in that they can be used in the desired manner even at relatively high application temperatures, as they occur, for example, in the modification of polyester, polyamide, polypropylene, but also polycarbonate (in particular, bisphenol A polycarbonate).

In general, the amount of the plastic particles to be worked is 0.01–60 wt %, preferably 0.5–25 wt %, based on the molding materials to be modified.

In addition to the molding materials which are to be processed only under high thermal stress, all others can also be taken into consideration.

One can mention, in particular, amorphous, glass-clear, perhaps also dyed thermoplastic molding materials of the type: polymethacrylate, polymethacrylate-styrene copolymers, polymethacrylate-styrene-maleic anhydride copolymers, polymethacrylimides, polystyrene, styrene copolymers, such as SAN.

In addition to the use of the particles, in accordance with the invention, in molding materials, the particles can also be used in cast resins. The working of particles, for example, in amounts of 0.01–30 wt %, into lacquers and here, in particular, into UV-curable reactive lacquers is preferred.

When using monodisperse particles in molding materials, either concentrates (master batches) or directly dry mixtures are used. Molding materials or dry mixtures that contain these particles can be processed by the known thermoplastic processing methods, for example, by extrusion, injection molding, injection blowing, extrusion blowing, coextrusion.

The advantageous use of these monodisperse bead polymers are used, on the one hand, for the pure surface refinement of molded bodies; in particular, however, special optical effects can be attained by working these particles into the molding material or coextrusion material and lacquers.

Molding materials containing these monodisperse particles are preferably used to manufacture back-projection walls, TV screens (slide projection walls, image production in general), projection walls, monitor coverings, scale coverings, light coverings and also diffusion lenses.

In addition, room partitions can also be produced with molding materials which contain these beads. The aforementioned applications represent only a small part of the usage possibilities for molding materials with these monodisperse particles.

The following examples are used to explain the invention. The determination of the particle size is carried out with a light microscope.

EXAMPLES

Example 1

A 1-L reactor with stirrer, condenser, nitrogen inlet, and thermometer is flushed with nitrogen; the following are weighed:

492.7 g Shell Risella gas oil G07 (mixture of paraffinic, naphthenic, and aromatic hydrocarbons, boiling range 237–276° C., density 0.857 g/cm³; viscosity 3.0 mm²/sec (DIN 51562), flash point: 106° C.)

173.0 g butyl acetate 277.5 g methyl methacrylate 15.0 g butyl acrylate 7.5 g allyl methacrylate 0.6 g dodecyl mercaptan 3.73 g Shellvis® 50 (SAP150) (styrene-isoprene copolymer; softening point: 110° C.; relative particle density (20° C.): 0.83 g/cm³, bulk density: 593 kg/m³;

heating is carried out at 70° C., and the mixture is stirred—until the emulsifier, the Shellvis® 50, is completely dissolved.

By the addition of a solution of 3 g bis(4-tert-butylcyclohexyl)peroxydicarbonate, dissolved in 27 g butyl acetate, the polymerization is started.

After 5 min, the initially clear reactor contents are colored white; the temperature has risen by 3° C. After 27 min, the internal temperature has attained the maximum at 77.7° C. Stirring is carried out for approximately 1 h more at 70° C., and then the mixture is heated for another hour at 80° C. until the reaction has been completed.

After cooling, a coagulate-free dispersion with a particle diameter of 4.1±0.2 μm results.

For the work-up, the dispersion is diluted with 5 times the quantity of cyclohexane and filtered through a Seitz pressure filter (Seitz Filtermatte K250). Subsequently, the mixture is washed 4 times with cyclohexane and filtered. Then, drying takes place at 50° C. in a vacuum drying chamber.

The thermoanalysis produces the following values:

$T_{V0.05}=246°$ C.

$T_{V0.1}=252°$ C.

$T_{V0.2}=261°$ C.

$T\lambda max1.2=292°$ C./352° C.

The $T_{V0.056}$ value indicates the temperature at which the rate of degradation of the polymers is 0.05% with a rate of heating of 5° C./min.

Correspondingly, the $T_{V0.2}$ value indicates the temperature at which the rate of degradation of the polymer is 0.2% with a rate of heating of 5° C./min.

$T_{\lambda max}$ indicates the temperature of the maximum rate of degradation.

The measurement of the $T_V$ value is carried out on a thermobalance under inert gas.

Obviously, numerous modifications and variations of the present invention are possible in light of the above teachings. It is therefore to be understood that within the scope of the appended claims, the invention may be practiced otherwise than as specifically described herein.

This application is based on German Patent Application P 44 46 370.7, filed with the German Patent Office on Dec. 23, 1994, the entire contents of which are hereby incorporated by reference.

A suitable synthesis method is described in German Patent Application P 44 46 365.0, filed in the German Patent Office on Dec. 23, 1994, the entire contents of which are hereby incorporated by reference.

What is claimed as new and is desired to be secured by Letters Patent of the United States is:

1. Crosslinked plastic particles based on polymethyl (meth)acrylate with a particle diameter of 1–15 μm, synthesized from the monomers consisting essentially of:

A) 20 to 99.9 wt % of methyl methacrylate;

B) 0 to 79 wt % of methacrylic acid ester of formula I:

wherein $R_1$ stands for a $C_{2-8}$ alkyl radical, a $C_{4-5}$ cycloalkyl radical, a $C_{4-5}$ cycloalkyl radical substituted with $C_{1-4}$ alkyl, a $C_{6-14}$ aryl radical, a substituted $C_{6-14}$ aryl radical or an aralkyl radical;

C) 0 to 50 wt % of an acrylic acid ester of formula II:

wherein $R_2$ stands for a $C_{1-8}$ alkyl radical, a $C_{5-6}$ cycloalkyl radical, a $C_{5-6}$ cycloalkyl radical substituted with $C_{1-4}$ alkyl, a $C_{6-14}$ aryl radical, a substituted $C_{6-14}$ aryl radical or an aralkyl radical;

D) 0.1 to 20 wt % of at least one crosslinking monomer containing at least two radically polymerizable groups in the molecule, using 0.01 to 1 part by weight, based on the plastic particles, of a molecular weight regulator.

2. The crosslinked plastic particles of claim 1, wherein said methacrylic acid esters of formula I are present in an amount of 20–55 wt %.

3. The crosslinked plastic particles of claim 1, wherein said acrylic acid esters of formula II are present an amount of 1–30 wt %.

4. The crosslinked plastic particles of claim 1, wherein said crosslinking monomers are present in an amount of 1–9 wt %.

5. The crosslinked plastic particles of claim 1, wherein a molecular weight $M_W$ is regulated by using a molecular weight regulator and said $M_W$ would lie in the range of 10,000 to 1,000,000 daltons if polymerization were conducted in the absence of said crosslinking agents.

6. The crosslinked plastic particles of claim 1, wherein at least 80 wt % of said particles lie within a size range of 2 μm to 10 μm.

7. The crosslinked plastic particles of claim 1, wherein said molecular weight regulator is a sulfur regulator.

8. The crosslinked plastic particles of claim 1, wherein said molecular weight regulator is selected from the group consisting of dodecyl mercaptan, tert-dodecyl mercaptan, n-butyl mercaptan, butyl thioglycolate, 2-ethylhexyl thioglycolate, pentaerythritol tetrathioglycolate and a mixture thereof.

9. A cast resin comprising the crosslinked plastic particles of claim 1.

10. A lacquer comprising the crosslinked plastic particles of claim 1.

11. A molding material comprising:

1) a crosslinked plastic particle based on polymethyl (meth) acrylate with a particle diameter of 1–15 μm, synthesized from the monomers comprising:

A) 20 to 99.9 wt % of methyl methacrylate;

B) 0 to 79 wt % of methacrylic acid ester of formula I:

$$CH_2=C(CH_3)-COOR_1 \quad (I)$$

wherein $R_1$ stands for a $C_{2-8}$ alkyl radical, a $C_{4-5}$ cycloalkyl radical, a $C_{4-5}$ cycloalkyl radical substituted with $C_{1-4}$ alkyl, a $C_{6-14}$ aryl radical, a substituted $C_{6-14}$ aryl radical or an aralkyl radical;

C) 0 to 50 wt % of an acrylic acid ester of formula II:

$$CH_2=CH-COOR_2 \quad (II)$$

wherein $R_2$ stands for a $C_{1-8}$ alkyl radical, a $C_{5-6}$ cycloalkyl radical, a $C_{5-6}$ cycloalkyl radical substituted with $C_{1-4}$ alkyl, a $C_{6-14}$ aryl radical, a substituted $C_{6-14}$ aryl radical or an aralkyl radical;

D) 0.1 to 20 wt % of at least one crosslinking monomer containing at least two radically polymerizable groups in the molecule, using 0.01 to 1 part by weight, based on the plastic particles of a molecular weight regulator; and 2) a thermoplastic molding material.

12. The molding material of claim 11, wherein said thermoplastic molding material is selected from the group consisting of polymethacrylate, polymethacrylate-styrene copolymers, polymethacrylate-styrene-maleic anhydride copolymers, polymethacrylimides, polystyrene and styrene acrylonitrile copolymer.

* * * * *

UNITED STATES PATENT AND TRADEMARK OFFICE
CERTIFICATE OF CORRECTION

PATENT NO. : 5,714,261
DATED : February 3, 1998
INVENTOR(S) : Werner Siol, et al.

It is certified that error appears in the above-identified patent and that said Letters Patent is hereby corrected as shown below:

Column 6, Line 57, "$C_{4-5}$ cycloalkyl" should read --$C_{5-6}$ cycloalkyl--.

Column 6, Line 58, "$C_{4-5}$ cycloalkyl" should read --$C_{5-6}$ cycloalkyl--.

Column 8, Line 10, "$C_{4-5}$ cycloalkyl" should read --$C_{5-6}$ cycloalkyl--.

Column 8, Line 11, "$C_{4-5}$ cycloalkyl" should read --$C_{5-6}$ cycloalkyl--.

Signed and Sealed this

Sixth Day of July, 1999

Attest:

Q. TODD DICKINSON

*Attesting Officer*  *Acting Commissioner of Patents and Trademarks*